US007486830B2

(12) United States Patent
Kimura

(10) Patent No.: US 7,486,830 B2
(45) Date of Patent: Feb. 3, 2009

(54) DECODING APPARATUS, DECODING METHOD AND PROGRAM PRODUCT THEREFOR

(75) Inventor: Shunichi Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 446 days.

(21) Appl. No.: 11/151,212

(22) Filed: Jun. 14, 2005

(65) Prior Publication Data

US 2006/0210182 A1 Sep. 21, 2006

(30) Foreign Application Priority Data

Mar. 18, 2005 (JP) ............................. 2005-079246

(51) Int. Cl.
*G06K 9/36* (2006.01)
(52) U.S. Cl. .................................... 382/233
(58) Field of Classification Search .......... 382/232–253
See application file for complete search history.

(56) References Cited

U.S. PATENT DOCUMENTS

| 5,495,538 | A | * | 2/1996 | Fan .......................... 382/233 |
| 5,608,654 | A | * | 3/1997 | Matsunoshita ............. 358/1.15 |
| 5,615,288 | A | * | 3/1997 | Koshi et al. ................. 382/248 |
| 5,787,204 | A | * | 7/1998 | Fukuda ....................... 382/233 |
| 5,822,463 | A | * | 10/1998 | Yokose et al. ............... 382/251 |
| 5,828,789 | A | * | 10/1998 | Yokose et al. ............... 382/239 |
| 6,072,909 | A | * | 6/2000 | Yokose et al. ............... 382/247 |
| 6,157,741 | A | * | 12/2000 | Abe et al. .................... 382/233 |
| 6,205,254 | B1 | * | 3/2001 | Koshi et al. .................. 382/239 |
| 6,510,252 | B1 | * | 1/2003 | Kishimoto ................... 382/252 |
| 6,552,822 | B1 | * | 4/2003 | Kishimoto ................... 358/3.03 |
| 6,748,113 | B1 | | 6/2004 | Kondo et al. |
| 2002/0081035 | A1 | * | 6/2002 | Bright et al. ................. 382/233 |
| 2002/0085769 | A1 | * | 7/2002 | Yokose et al. ............... 382/250 |
| 2003/0007693 | A1 | * | 1/2003 | Yokose et al. ............... 382/233 |
| 2005/0271284 | A1 | * | 12/2005 | Chen et al. .................. 382/233 |
| 2006/0045361 | A1 | * | 3/2006 | Yokose ....................... 382/232 |

FOREIGN PATENT DOCUMENTS

| CN | 1286575 A | 3/2001 |
| JP | A-05-014735 | 1/1993 |
| JP | A-05-316361 | 11/1993 |
| JP | A-07-336684 | 12/1995 |
| JP | A-2004-080741 | 3/2004 |

OTHER PUBLICATIONS

U.S. Appl. No. 11/153,395, filed Jun. 16, 2005, Shunichi Kimura.

(Continued)

*Primary Examiner*—Jingge Wu
*Assistant Examiner*—Max Shikhman
(74) *Attorney, Agent, or Firm*—Oliff & Berridge PLC

(57) ABSTRACT

A decoding apparatus for decoding compression data has a reference value extracting unit and a decoded data generating unit. The reference value extracting unit extracts reference compression data to be referred for the compression data to be processed. The decoded data generating unit generates decoded data corresponding to the compression data based on the reference compression data extracted by the reference value extracting unit and the compression data.

14 Claims, 12 Drawing Sheets

OTHER PUBLICATIONS

U.S. Appl. No. 11/168,920, filed Jun. 29, 2005, Shunichi Kimura.

U.S. Appl. No. 11/172,967, filed Jul. 5, 2005, Shunichi Kimura.

U.S. Appl. No. 11/179,988, filed Jul. 13, 2005, Shunichi Kimura.

"Information Technology—JPEG 2000 image coding system: Core coding system"; International Telecommunication Union; ITU-T; Telecommunication Standardization Sector of ITU; Series T: Terminals for Telematic Services; T.800; Aug. 2002.

"Information Technology—Digital Compression and Coding of Continuous-Tone Still Images—Requirements and Guidelines"; International Telecommunication Union; CCITT; The International Telegraph and Telephone Consultative Committee; Terminal Equipment and Protocols for Telematic Services; T.81; Sep. 1992.

David J. Heeger et al.; "Pyramid-Based Texture Analysis/Synthesis"; *Computer Graphics*, SIGGRAPH 95; pp. 229-238, 1995.

Allen Gersho et al.; "The Optical Decoder for a Given Encoder"; Vector Quantization and Signal Compression; pp. 177-178; 1992.

Kégl et al., "Learning and Design of Principal Curves," IEEE Transactions on Pattern Analysis and Machine Intelligence, vol. 22, No. 3, 2000, pp. 281-297.

Taubman et al., "JPEG2000—Image Compression Fundamentals, Standards and Practice," Kluwer Academic Publishers, 2002, pp. 14, 97-99 and 481-484.

* cited by examiner

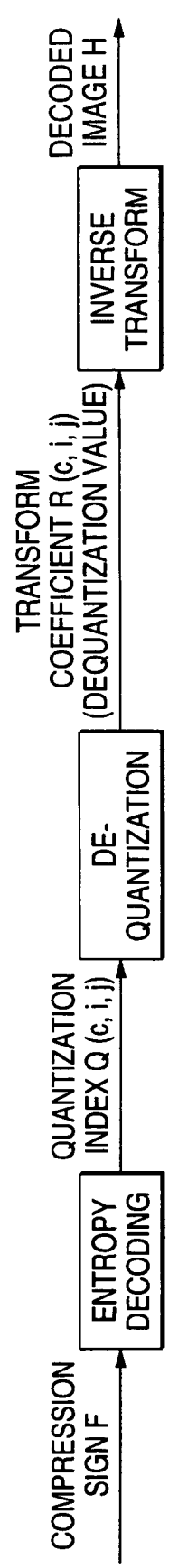

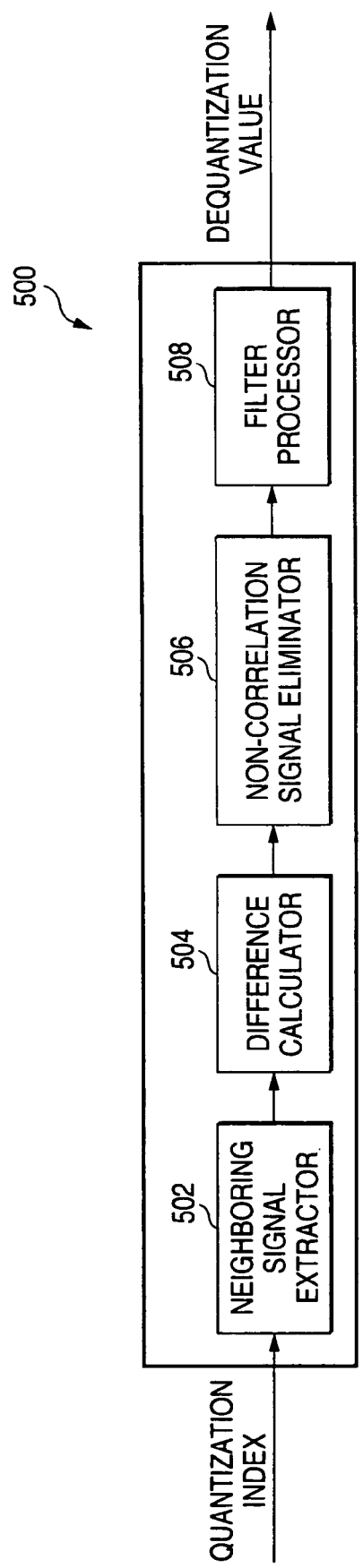

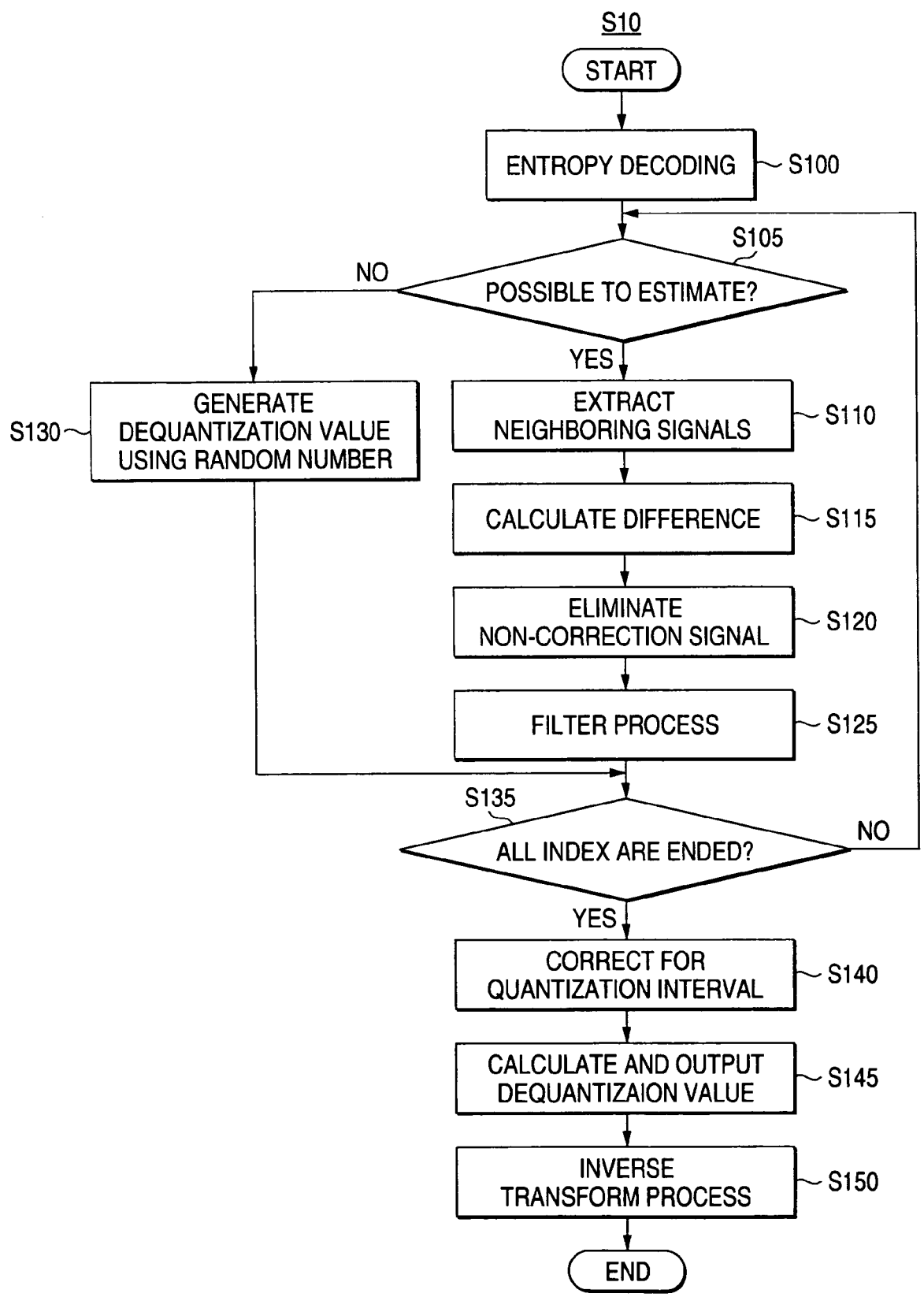

FIG. 7A

| 1/16 | 1/16 | 1/16 |
|------|------|------|
| 1/16 | 0    | 1/16 |
| 1/16 | 1/16 | 1/16 |

FIG. 7B

| 1/16 | 1/16 | 1/16 |
|------|------|------|
| 1/16 | 8/16 | 1/16 |
| 1/16 | 1/16 | 1/16 |

FIG. 8A

| X1 | X2 | X3 |
|----|----|----|
| X4 | X0 | X5 |
| X6 | X7 | X8 |

FIG. 8B

| K1 | K2 | K3 |
|----|----|----|
| K4 | K0 | K5 |
| K6 | K7 | K8 |

DECODING APPARATUS, DECODING METHOD AND PROGRAM PRODUCT THEREFOR

BACKGROUND OF THE INVENTION

1. Field of the Invention

The present invention relates to a decoding apparatus for decoding code data generated by an encoding process. More specifically, the present invention relates to a decoding apparatus for decoding code data generated by an encoding process including quantization of data by dequantizing the code data.

2. Description of the Related Art

Since images, audios or the like have enormous amount of data, it is common to maintain or transmit the data with the amount of data reduced by compressing it. For example, the amount of multi-value image data generated when color manuscripts or photographs are transformed into an electronic form by a scanner or when scenery or the like is photographed by a digital camera can be significantly reduced by compressing the data using a lossy coding process such as JPEG, JPEG200 or the like.

However, this lossy coding process has a problem with coding distortion. In particular, the JPEG process has a problem in that block distortion occurs at DCT block boundaries of decoded images (coding distortion).

For example, JP-A-5-014735 discloses a method in which a low pass filter is provided only at a boundary between DCT (discrete cosine transform) blocks.

JP-A-5-316361 discloses a method in which it is determined whether or not edges are present in an image, and, based on a result of the determination, a filter to be provided is selected.

JP-A-7-336684 discloses a method in which noises are added to DCT coefficients when it is determined that distortion is noticeable in a region.

A JPEG standard is disclosed in a document "ITU-T Recommendation T.81".

A JPEG2000 standard is disclosed in a document "ITU-T Recommendation T.800".

A method in which images having more similar textures are synthesized by adjusting distribution of frequency of transform coefficients, is disclosed in a document "D. Heeger and J. Bergen, "Pyramid based texture analysis/synthesis," Computer Graphics, pp. 229-238, SIGGRAPH 95, 1995".

SUMMARY OF THE INVENTION

In consideration of the above circumstances, the invention provides a decoding apparatus for decoding code data more efficiently.

According to a first aspect of the invention, there is provided a decoding apparatus including: a reference value extracting unit that extracts reference compression data to be referred for compression data to be processed; and a decoded data generating unit that generates decoded data corresponding to the compression data based on the reference compression data extracted by the reference value extracting unit and the compression data.

According to a second aspect of the invention, there is provided a decoding apparatus including: a reference signal extracting unit that extracts signals in the neighborhood of a central signal to be processed; a difference calculating unit that calculates differences between the neighboring signals extracted by the reference signal extracting unit and the central signal; and a filter processing unit that performs a preset filter process for the differences calculated by the difference calculating unit.

According to a third aspect of the invention, there is provided a decoding method including: extracting reference compression data to be referred for compression data to be processed; and generating decoded data corresponding to the compression data based on the extracted reference compression data and the compression data.

According to a fourth aspect of the invention, there is provided a decoding method including: calculating weight coefficients based on differences between transform coefficients calculated in a transform encoding process and quantization values of the transform coefficients; attaching the calculated weight coefficients to code data of the transform coefficients; and generating decoded data corresponding to compression data based on the weight coefficients attached to the code data, the compression data included in the code data, and reference compression data included in the code data.

According to a fifth aspect of the invention, there is provided a program product for causing a computer system to execute procedures including: extracting reference compression data to be referred for compression data to be processed; and generating decoded data corresponding to the compression data based on the extracted reference compression data and the compression data.

BRIEF DESCRIPTION OF THE DRAWINGS

Embodiments of the present invention will be described in detail based on the following figures, wherein:

FIG. 1A is a block diagram schematically illustrating an encoding process of a transform coding scheme such as JPEG and JPEG2000;

FIG. 1B is a block diagram schematically illustrating a decoding process of a transform coding scheme such as JPEG and JPEG2000;

FIG. 5 is a diagram illustrating details of a dequantization value estimator 500 in shown FIG. 4;

FIG. 6 is a flow chart of a decoding process (S10) by the decoding program 5 shown in FIG. 4;

FIG. 7A is a diagram illustrating a filter kernel K, having a difference value P as its input, applied by a filter processor 508;

FIG. 7B is a diagram illustrating a filter kernel K, having a quantization index Q or a dequantization value R as its input, applied by a filter processor 508;

FIG. 8A is a diagram illustrating the arrangement of difference values X used to calculate filter factors K;

FIG. 8B is a diagram illustrating the arrangement of the filter factors K;

FIG. 12A is a diagram illustrating a fine line detection pattern corresponding to a horizontal fine line;

FIG. 12B is a diagram illustrating a fine line detection pattern corresponding to a vertical fine line;

FIG. 12C is a diagram illustrating a fine line detection pattern corresponding to an oblique fine line; and FIG. 12D is a diagram illustrating a fine line detection pattern corresponding to an oblique fine line.

DETAILED DESCRIPTION OF THE EMBODIMENT

Firstly, a mechanism for coding distortion of a lossy coding process will be described.

FIGS. 1A and 1B are block diagrams schematically illustrating a transform coding scheme such as JPEG and JPEG2000, where FIG. 1A shows an outline of an encoding process and FIG. 1B shows an outline of a decoding process.

Figure 2A:
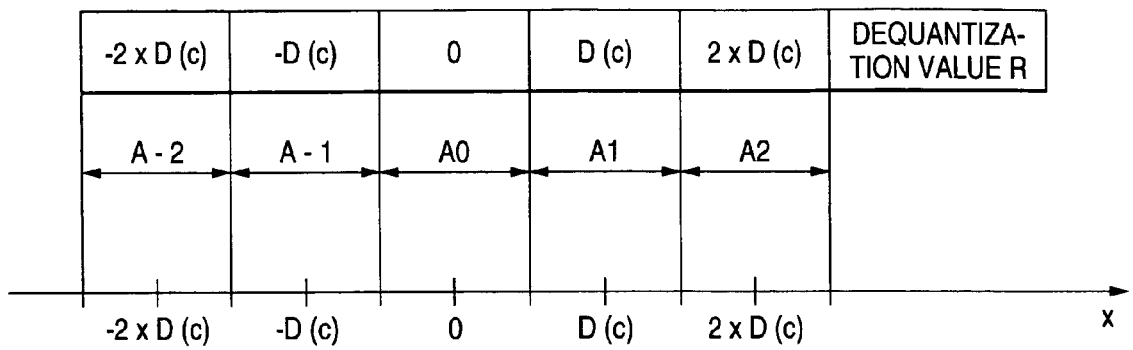
FIG. 2A is a diagram illustrating a quantization process in the transform coding scheme.
Figure 2B:
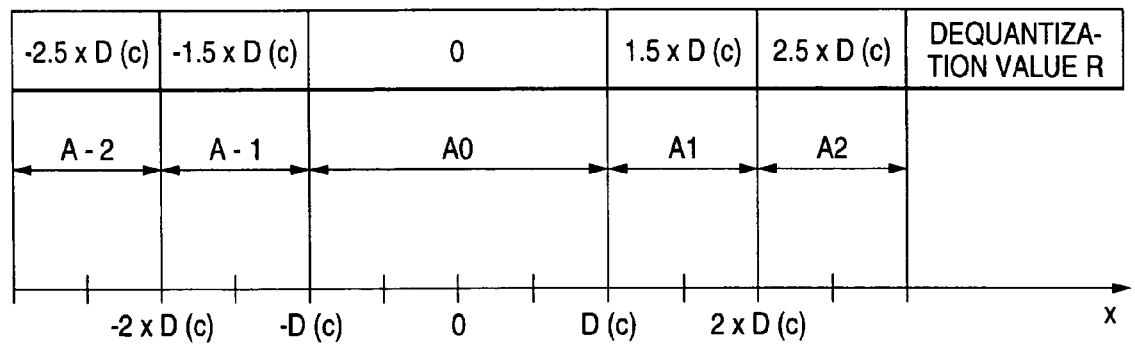
FIG. 2B is a diagram illustrating a quantization process in the transform coding scheme.
Figure 2C:
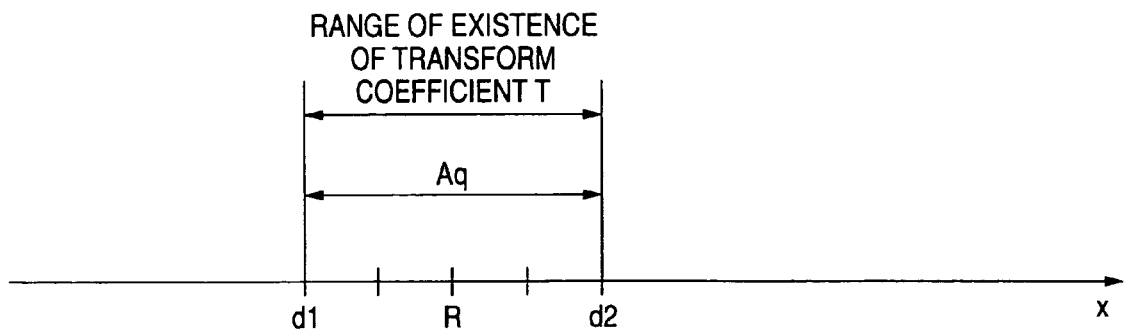
FIG. 2C is a diagram illustrating a quantization process in the transform coding scheme.

FIGS. 2A to 2C are diagrams illustrating a quantization process in the transform coding scheme. A transform coefficient $T(c, i, j)$ and a quantization index $Q(c, i, j)$ shown in FIGS. 1A and 1B are the function of variables c, i and j. The variable c is an index indicating the kind of transform coefficient. For example, in the case of a DCT transform using an 8×8 block, the variable c is a value (an integer having a range of 1 to 64) indicating one of 64 (8×8) transform coefficients, and, in a case of a wavelet transform, the variable c is a value indicating one of the components such as 1HH, 1LH, 1HL, 2HH, 2LH, 2HL, . . . , NLLL. In addition, the transform variables i and j are variables indicating positions of the transform coefficients, respectively. For example, in the case of the DCT transform, a c-th transform coefficient in a block located at an i-th row from the top and a j-th column from the left is indicated as $T(c, i, j)$, and, in the case of the wavelet transform, data of a c-th transform coefficient in a block located at an i-th row from the top and a j-th column from the left is indicated as $T(c, i, j)$.

As shown in FIG. 1A, in an encoding process of the transform coding scheme, an input image G is subject to a transform process such as the discrete cosine transform (DCT) or the wavelet transform to generate a transform coefficient T of the input image G. The transform coefficient T is then quantized into a quantization index Q. The quantization index Q is subject to an entropy coding process (lossless coding process) to be a compression code F.

Here, the quantization index refers to information by which quantization values can be distinguished. In addition, the quantization values refer to degenerate values where a group of numerical values within a specific range (quantization interval) are degenerated. For example, as shown in FIGS. 2A to 2C, the quantization values are discrete values ($-2 \times D(c)$ ~$2 \times D(c)$ in this example) representing quantization intervals (A−2~A2), respectively.

Code data (the compression code F) generated in this way are entropy-decoded into a quantization index Q, as shown in FIG. 1B. This quantization index Q is equivalent to the quantization index Q in the encoding process.

Then, the quantization index Q is dequantized into a transform coefficient R (i.e., a dequantization value), which is then inversely transformed to generate a decoded image H.

Here, the dequantization value refers to a value generated based on the quantization index or the quantization value and used for decoding of data. For example, the dequantization value is a transform coefficient of the JPEG or JPEG2000 scheme (transform coefficient corresponding to the quantization index).

In the above-described process, coding distortion occurs when the quantization is performed. In general, precision of the transform coefficient T of an original image is higher than that of the quantization index Q. Accordingly, the transform coefficient R reproduced by using the quantization index Q is different from the original transform coefficient T. This is the reason for the coding distortion.

Next, the quantization and the dequantization will be described in detail with reference to FIGS. 2A to 2C.

The quantization is performed using a quantization step width $D(c)$ prepared for each transform coefficient c. The quantization step width $D(c)$ is the function of the kind of transform coefficient c. For example, in the case of JPEG, the quantization index Q is calculated according to the following equation in the quantization.

$Q(c,i,j) = \text{round}(T(c,i,j)/D(c))$

Where, round ( ) is the function to output an integer closest to an input value.

In addition, the dequantization value R is calculated according to the following equation in the dequantization.

$R(c,i,j) = Q(c,i,j) \times D(c)$

In the case of JPEG2000, the quantization index Q and the dequantization R are calculated according to the following equations.

$Q(c,i,j) = \text{sign}(T(c,i,j)) \times \text{floor}(|T(c,i,j)|/D(c))$ $R(c,i,j) = (Q(c,i,j)+r) \times D(c)$, if $Q(c,i,j) > 0$ $R(c,i,j) = (Q(c,i,j)-r) \times D(c)$, if $Q(c,i,j) < 0$ $R(c,i,j) = 0$, if $Q(c,i,j) = 0$ Where, 'sign( )' is the function to output positive and negative signs, 'floor( )' is the function to null decimal places, and '| |' is a symbol representing an absolute value.

In addition, 'r' is a numerical value within the range of 0 to 1, typically, 0.5. In the JPEG2000, there may be a case where lower bits are not encoded. Here, a case where all bits including the least significant bit are encoded will be described by way of examples.

As shown in FIG. 2A, in the encoding process of the JPEG scheme, transform coefficients T (before the quantization) generated by the transform process performed for the input image G are distributed on an X axis, which is a numerical straight line.

If a transform coefficient T exists in a quantization interval A0, the quantization index Q becomes 0 by the quantization process. Similarly, if a transform coefficient T exists in a quantization interval Aq, the quantization index Q becomes q.

Then, when the dequantization is performed for the quantization index Q, in a case in which the quantization index Q is 0, the dequantization value R of 0 is generated by the dequantization process, and, in a case in which the quantization index Q is 1, the dequantization value R of $D(c)$ is generated.

Similarly, in the JPEG2000 scheme, as shown in FIG. 2B, if a transform coefficient T exists in a quantization interval Aq, the quantization index Q becomes q. Then, when the dequantization is performed for the quantization index Q, dequantization values corresponding to quantization indexes Q in a one-to-one manner are generated.

Here, for the sake of simplicity, only the quantization interval Aq in which the quantization index Q becomes q will be considered.

It is assumed that the transform coefficient T exists in the quantization interval Aq.

As shown in FIG. 2C, the quantization interval Aq has a range of d1 to d2. In this case, the transform coefficient T is included in the range of d1 to d2. In addition, it is assumed that a dequantization value of the transform coefficient T is R.

Under this condition, a transform coefficient for generating a decoded image is the dequantization value R. However, the transform coefficient T of an original image T has a value within the range of d1 to d2 and is not limited to the dequantization value R. At this time, a difference between the original transform coefficient T and the dequantization value R occurs. This difference is the cause of the coding distortion.

As described previously, the lossy coding process realizes a lossy data compression by degenerating a plurality of data values (raw data values existing in quantization intervals) into one quantization value (a quantization value corresponding to each quantization interval), but at the same time, the coding distortion occurs due to the quantization.

In order to reduce this coding distortion, a parameter for reducing compression efficiency in the encoding process may be selected.

However, this causes a problem in which encoding efficiency is reduced and the amount of data is increased.

Further, when previously encoded data is intended to be represented as images with high quality, it is impossible to employ such a process in which the compression efficiency is reduced.

For this reason, there have been various techniques suggested for overcoming the image distortion problem in a decoding process.

In a broad classification, there is a method in which a decoded image is subject to a low pass filtering process so as to make coding distortion faint so that it is not seen (a filtering method) and another method in which noises are added to the decoded image or the transformation coefficient so as to make coding distortion faint so that it is not seen (a noise method).

First, the method using the low pass filtering process (the filtering method) will be described.

For example, JP-A-5-014735 discloses a method in which a low pass filter is provided only at a boundary between DCT blocks in order to remove block distortion.

This method makes the coding distortion faint using the low pass filter so that it is difficult for this distortion to be discriminated.

However, this method has a problem in that edge components of an original image become faint as well.

In addition, JP-A-5-316361 discloses a method in which a plurality of low pass filters are prepared, it is determined whether or not edges are present in an image, and, based on the result of the determination, a filter not to cause the edges to be faint is selectively provided.

Next, the method of adding noises (the noise method) will be described.

For example, JP-A-7-336684 discloses a method in which noises are added to DCT coefficients so as to make the coding distortion faint, when it is determined that distortion is noticeable in the region.

In this method, the coding distortion is considered to be noticeable when the region is determined to be a flat image region.

When a decoded image is generated from an encoded image (i.e., a decoding process is performed), it is a goal to approach the decoded image as close as possible to an original image before the original is subject to an encoding process.

From this point of view, the above-mentioned conventional methods do not provide an optimal solution since faintness of the image by the low pass filter or addition of the noises does not approach the decoded image to the original image.

More specifically, these methods may have some side effects as follows.

(1) In the filter method, signals in a high-frequency band of the decoded image are suppressed. Accordingly, when textures of high frequency components are present in the original image, it is impossible to reproduce these textures.

(2) In the filter method, there may be a possibility of dullness of the edge due to a possibility of incorrect edge determination.

(3) In the noise method, there may be a possibility of textures occurring, which are not present in the original image, due to the addition of noises.

Accordingly, a decoding apparatus 2 according to the present embodiment generates a decoded image as close as possible to an input image by approaching distribution of frequency of dequantization values R to distribution of frequency of transformation coefficients T of the input image to the utmost.

That is, in the standard techniques such as the JPEG or JPEG2000 schemes, the distribution of frequency of the dequantization values is focused on one point of a value R. However, more satisfactory decoding process is achieved by approaching the distribution of frequency of dequantization values to the distribution of frequency of transformation coefficients of the original image as close as possible.

This is because it is considered that a decoded imaging having the distribution of frequency of the dequantization values close to the distribution of frequency of the transform coefficients of the original image is closer to the original image than a decoded imaging having the distribution of frequency of the dequantization values different from the distribution of frequency of the transform coefficients of the original image, although it may not be concluded that the original image is identical with the decoded image even when the distribution of frequency of the dequantization values of the decoded image is identical with the distribution of frequency of the transform coefficients of the original image. In reality, there is disclosed a method in which images having more similar textures are synthesized by adjusting the distribution of frequency of transform coefficients, in a document: (D. Heeger and J. Bergen, "Pyramid based texture analysis/synthesis," Computer Graphics, pp. 229-238, SIGGRAPH 95, 1995).

The decoding apparatus 2 according to the present embodiment generates the decoded image having textures closer to those of the original image by generating the decoded image having the distribution of frequency of the dequantization values closer to the distribution of frequency of the transform coefficients of the original image.

More specifically, the decoding apparatus 2 according to the present embodiment generates a corrected dequantization value Ry by correcting the dequantization value R corresponding to the quantization index Q, which is to be processed, based on a different quantization index Q.

The corrected dequantization value Ry (c, i, j) is a dequantization value that can be expected to be closer to the distribution of frequency of the transform coefficients of the original image, and, for example, is expressed by the following equation.

$$Ry(c,i,j) = R(c,i,j) + \alpha \times D(c)$$

Where, α is a correction factor and, in the case of the JPEG scheme, is a value satisfying a restriction of $-0.5 \leq \alpha \leq 0.5$. In the case of the JPEG2000 scheme, α is a value satisfying restrictions of $0 \leq r+\alpha \leq 1$ if $Q(c, i, j) > 0$, $-1 \leq -r+\alpha \leq 0$ if $Q(c, i, j) < 0$, and $-1 \leq \alpha \leq 1$ if $Q(c, i, j) = 0$.

The above restrictions to α are set such that a quantization interval does not go beyond the original quantization interval (between d1 and d2).

The decoding apparatus 2 according to the present embodiment uses neighboring quantization indexes Q(c, i+m, j+n) (where, $-M \leq m \leq M$, $-N \leq n \leq N$) of the same kind c as the quantization indexes Q(c, i, j) to be processed in order to estimate the correction factor α. That is, for the estimation of the numerical value α, a correlation between the neighboring quantization indexes and the numerical value α is used.

EMBODIMENTS

Hereinafter, an embodiment of the invention will be described.

In this embodiment, a case where code data encoded according to the JPEG scheme is decoded will be described by way of examples. A decoding process to be described in this embodiment is approximately similar to that described in ITU-T Recommendation T.81. However, the decoding process of this embodiment is different in a dequantization process from that of ITU-T Recommendation T.81.

Hardware Configuration

First, a hardware configuration of the decoding apparatus 2 according to this embodiment will be described.

Figure 3:
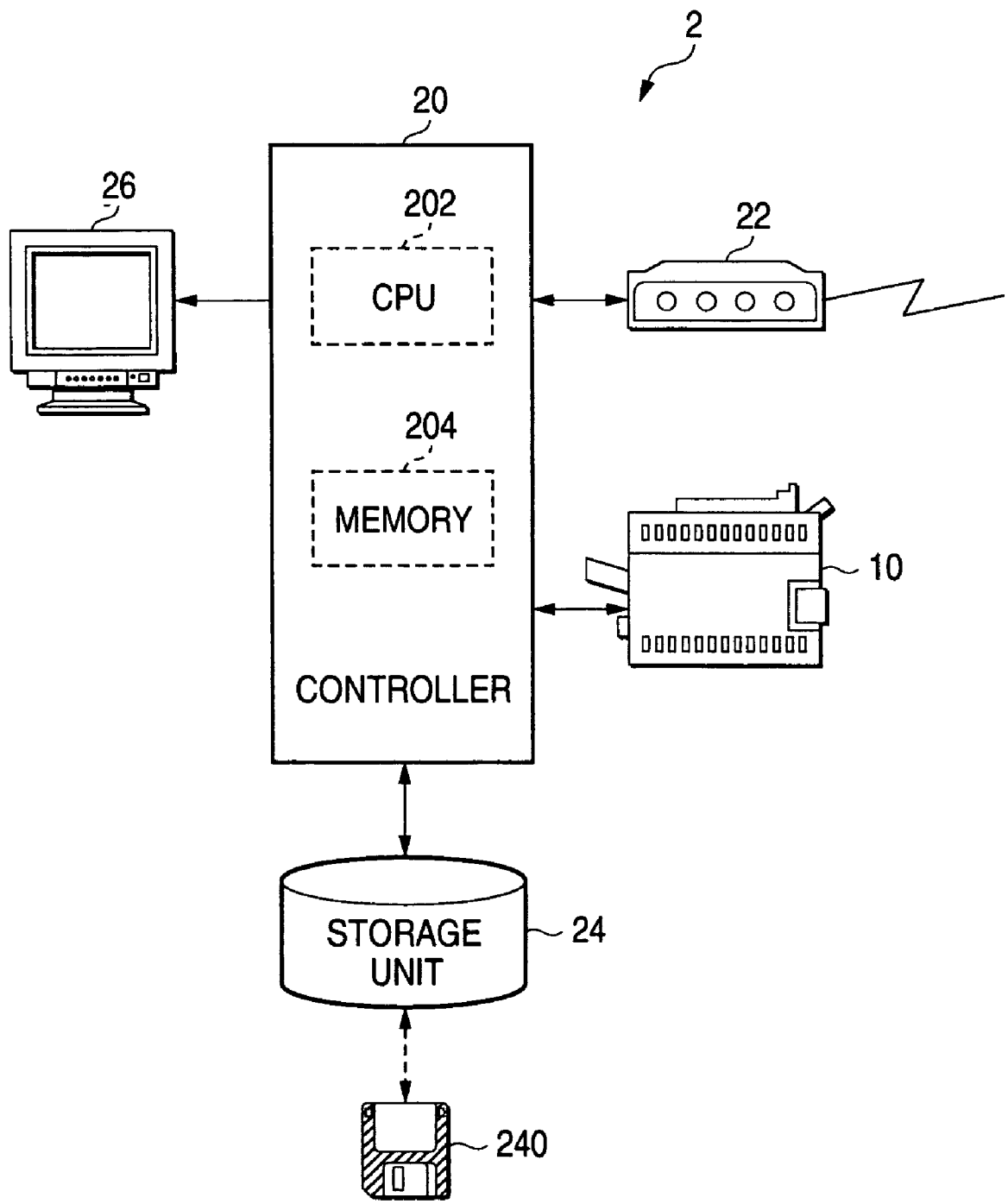
FIG. 3 is a diagram illustrating a hardware configuration of a decoding apparatus 2 to which a decoding method according to the invention is applied, with a controller 20 as the central figure.

FIG. 3 is a diagram illustrating a hardware configuration of the decoding apparatus 2 to which a decoding method according to the invention is applied, with a controller 20 as the central figure.

As shown in FIG. 3, the decoding apparatus 2 includes a controller 20 including CPU 202, a memory 204 and the like, a communication unit 22, a storage unit 24 such as HDD, CD and the like, and a user interface unit (UI unit) 26 including an LCD display device or a CRT display device, a key board, a touch panel and the like.

The decoding apparatus 2 is a general-purpose computer in which a decoding program 5, which will be described later, is installed. The decoding apparatus 2 acquires code data through the communication unit 22, the storage unit 24 or the like and decodes the acquired code data.

Decoding Program

Figure 4:
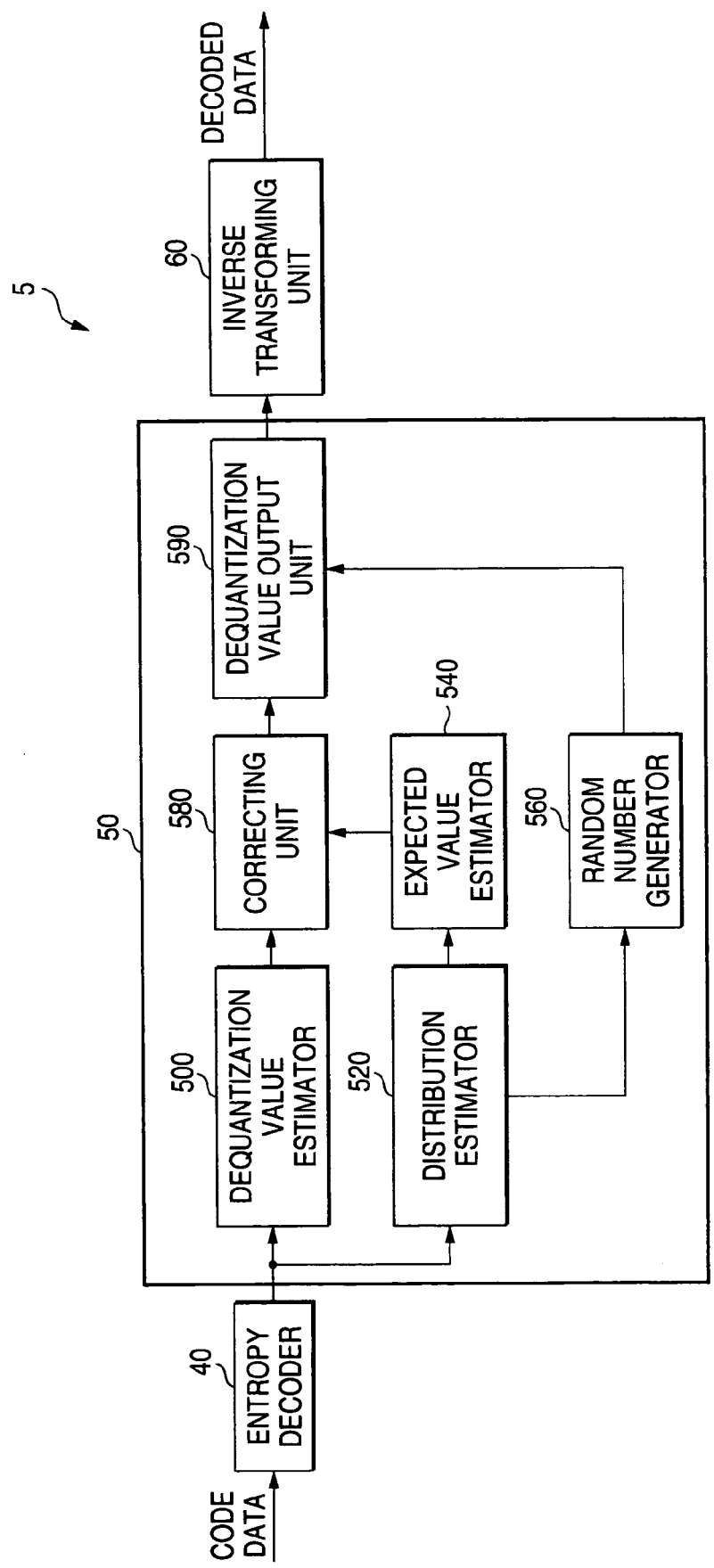
FIG. 4 is a diagram illustrating a functional configuration of a decoding program 5 executed by the controller 20 shown in FIG. 3 for implementing a decoding method according to the invention.

FIG. 4 is a diagram illustrating a functional configuration of the decoding program 5 executed by the controller 20 shown in FIG. 3 for implementing a decoding method according to the invention.

As shown in FIG. 4, the decoding program 5 includes an entropy decoder 40, a dequantizer 50 and an inverse transforming unit 60.

The dequantizer 50 includes a dequantization value estimator 500, a distribution estimator 520, an expected value estimator 540, a random number generator 560, a correcting unit 580, and a dequantization value output unit 590.

In the decoding program 5, the entropy decoder 40 entropy-decodes input code data and outputs the decoded data to the dequantizer 50.

The entropy decoder 40 of this embodiment decodes the input code data to generate the quantization index Q and outputs the generated quantization index to the dequantizer 50.

The dequantizer 50 generates a dequantization value based on the quantization index input from the entropy decoder 40 and outputs the generated dequantization value to the inverse transforming unit 60.

The inverse transforming unit 60 performs an inverse transform based on the dequantization value input from the dequantizer 50 to generate a decoded image.

In the dequantizer 50, the dequantization value estimator 500 estimates one dequantization value based on a plurality of quantization indexes input from the entropy decoder 40 and outputs the estimated dequantization value to the correcting unit 580.

More specifically, the dequantization value estimator 500 estimates a dequantization value of specific partial data to be processed, based on a quantization index of the partial data to be processed and a quantization index (for example, a quantization index of the same kind c as the transform coefficient) of another partial data adjacent to the specific partial data (for example, image data in an image region adjacent to a relevant image region)

The dequantization value estimator 500 of this embodiment calculates a correction factor α of the dequantization value R corresponding to the quantization index of a relevant block, based on the quantization index of the relevant block and the quantization index (limited to the quantization index of the same kind c as the transform coefficient) of another block adjacent to the relevant block and outputs the calculated correction factor α to the correcting unit 580.

The distribution estimator 520 estimates distribution of transform coefficients (of raw data) based on a plurality of quantization indexes (or, dequantization values corresponding to the plurality of quantization indexes) input from the entropy decoder 40 and outputs data representing the estimated distribution of transform coefficients to the expected value estimator 540 and the random number generator 560.

The expected value estimator 540 calculates an expected value of the dequantization value based on the distribution data input from the distribution estimator 520 and outputs the calculated expected value and the distribution data to the correcting unit 580.

The random number generator 560 generates random numbers according to the distribution data input from the distribution estimator 520 and outputs the generated random numbers to the dequantization value output unit 590.

The correcting unit 580 corrects the dequantization value (the correction factor α of the dequantization value in this example) input from the dequantization value estimator 500 to be within a preset range (for example, in the case of the dequantization value, a quantization interval corresponding to the quantization index) and outputs the corrected dequantization value (the correction factor α) to the dequantization value output unit 590.

In addition, the correcting unit 580 corrects the dequantization value (the correction factor α of the dequantization value in this example) input from the dequantization value estimator 500, based on the distribution data or the expected value of the dequantization value input from the expected value estimator 540.

The correcting unit 580 in this example corrects the correction factor α input from the dequantization value estimator 500. More specifically, the correcting unit 580 in this example makes a linear correction to the correction factor α such that the correction factor α falls within the range of $-0.5$ to $0.5$ in the JPEG scheme. That is, the correcting unit 580 selects the maximum value αmax and the minimum value αmin of the correction factors α corresponding to the same quantization index and linearly transforms the entire correction factors α such that the selected maximum value αmax and minimum value αmin fall within the preset range (the range of −0.5 to 0.5 in the JPEG scheme).

In addition, the correcting unit 580 may take the correction factors α as a boundary value of this range if the correction factors α exceed the range of −0.5 to 0.5. In addition, the correcting unit 580 may take the correction factors α as 0 if the correction factors exceed the range of −0.5 to 0.5.

The JPEG2000 scheme is different from the JPEG scheme only in the range of the correction factors α. That is, the correcting unit 580 corrects the correction factors α on the basis of a range of $0 \leq r+\alpha \leq 1$ if Q(c, i, j)>0, a range of $-1 \leq -r+\alpha \leq 0$ if Q(c, i, j)<0, and a range of $-1 \leq \alpha \leq 1$ if Q(c, i, j)=0, respectively.

The dequantization value output unit 590 (decoded data generating unit) determines a dequantization value to be applied by using the dequantization value (the correction factors α of the dequantization value in this example) input from the correcting unit 580 or the random numbers input from the random number generator 560 and outputs the determined dequantization value to the inverse transforming unit 60.

The dequantization value output unit 590 in this example calculates the dequantization value based on the correction factors α input from the correcting unit 580 or the random number generator 560 and the dequantization value corresponding to the quantization index.

Dequantization Value Estimator

FIG. 5 is a diagram illustrating details of the dequantization value estimator 500 shown in FIG. 4.

As shown in FIG. 5, the dequantization value estimator 500 includes a neighboring signal extractor 502, a difference calculator 504, a non-correlation signal eliminator 506, and a filter processor 508.

In the dequantization value estimator 500, the neighboring signal extractor 502 (reference value extracting unit) extracts quantization indexes Q(c, i+m, j+n) (where, $-M \leq m \leq M$ and $-N \leq n \leq N$) in the neighborhood of the quantization index Q(c, i, j) to be processed. The extracted neighboring quantization indexes have a matrix of (2M+1)×(2N+1).

The difference calculator 504 calculates a difference between each quantization index Q(c, i+m, j+n) extracted by the neighboring signal extractor 502 and the quantization index Q(c, i, j) to be processed.

The difference calculator 504 in this example creates a difference matrix of (2M+1)×(2N+1) constituted by difference values P(m, n) by performing the following calculation.

$$P(m,n)=Q(c,i+m,j+n)-Q(c,i,j)$$

The non-correlation signal eliminator 506 eliminates the neighboring quantization index Q(c, i+m, j+n) having a small correlation with the quantization index Q(c, i, j) to be processed by using a preset threshold TH.

More specifically, the non-correlation signal eliminator 506 determines that the neighboring quantization index Q(c, i+m, j+n) has a small correlation with the quantization index Q(c, i, j) if a difference calculated for each neighboring quantization index Q(c, i+m, j+n) by the difference calculator 504 is larger than the preset threshold TH, and accordingly, eliminates the neighboring quantization index Q(c, i+m, j+n).

The non-correlation signal eliminator 506 in this example takes P(m, n) as 0 if an absolute value of the difference |P(m, n)| is larger than the threshold TH in the difference matrix created by the difference calculator 504.

The threshold TH is, for example, 1.

The filter processor 508 calculates the correction factor α of the quantization index Q (c, i, j) to be processed, based on the neighboring quantization index Q(c, i+m, j+n) (except the neighboring quantization index eliminated by the non-correlation signal eliminator 506) extracted by the neighboring signal extractor 502.

More specifically, the filter processor 508 calculates the correction factor α based on the difference (except the difference eliminated by the non-correlation signal eliminator 506) calculated by the difference calculator 504.

The filter processor 508 in this example prepares a filter kernel K(m, n) of (2M+1)×(2N+1). This filter kernel K is preferably a filter having a two-dimensional low pass characteristic.

The filter processor 508 calculates the correction factor α according to the following equation (Equation 1).

$$\alpha = \sum_{m=-M}^{M} \sum_{n=-N}^{N} \{K(m,n) \times P(m,n)\} \qquad \text{(Equation 1)}$$

For example, considering the result of the calculation when the threshold TH=1 and coefficients (except a center) of the filter K have positive values, the correction factor α has a positive value if there are many neighboring quantization indexes having positive values. The more number of neighboring quantization indexes having positive values are given the larger value of the correction factor α. Similarly, the correction factor α has a negative value if there are many neighboring quantization indexes having negative values. If the number of neighboring quantization indexes having positive values is equal to the number of neighboring quantization indexes having negative values, an estimation value of the correction factor α is 0. In addition, values of the neighboring quantization indexes are largely different from a value of a relevant quantization index, the values of the neighboring quantization indexes may not be used for the estimation of the correction factor α.

Further, when a filter having a central filter coefficient of 0 is applied, the sum of filter coefficients is preferably 0.5. Such a design of the filter coefficient is desirable because the filter output falls within a range of −0.5 to 0.5, which is equal to the range of the correction factor α, if the filter input value is 0, 1, or −1. Or, if the filter coefficients are designed such that the sum of filter coefficients is less than 0.5, it is desirable because the filter output falls within the range of −0.5 to 0.5, without deviating from the range of the correction factor α, if the filter input value is 0, 1, or −1.

Furthermore, although it is shown in the above description that the filter kernel K has a matrix of odd number ' odd number, any matrix may be employed in reality. Also, although it is shown in the above description that the ranges of m and n are symmetrical in positive and negative directions, such as $-M \leq m \leq M$ and $-N \leq n \leq N$, the ranges of m and n are not limited to such a symmetrical form.

In addition, although it is shown in the above description that the width of the quantization interval (the quantization step width) is uniform in its entirety in the JPEG scheme, the width of the quantization interval is not uniform in the JPEG2000 scheme. For example, the quantization step width for the quantization index of 0 is double to that for the quantization indexes having values other than 0. In such a case, the dequantization value estimator 500 may estimate the dequantization value by using a value obtained by dividing the dequantization value R by the quantization step width D(c) without using the quantization index Q.

That is, (1) the neighboring signal extractor 502 extracts the dequantization values R(c, i+m, j+n) (where, $-M \leq m \leq M$ and $-N \leq n \leq N$), which are dequantized values of the quantization indexes in the neighborhood of the relevant quantization index Q(c, i, j). The extracted dequantization values R have the matrix of (2M+1)×(2N+1), (2) the difference calculator 504 creates the difference matrix P of (2M+1)×(2N+1) by calculating an equation, P(m, n)={R(c, i+m, j+n)−R(c, i, j)}/D(c) and (3) the non-correlation signal eliminator 506 and the filter processor 508 perform the same operations as those described above.

In the JPEG2000 scheme, the following is possible in order to omit multiplication/division of D(c).

(1) The neighboring signal extractor 502 extracts the dequantization values Q(c, i+m, j+n) (where, $-M \leq m \leq M$ and $-N \leq n \leq N$) in the neighborhood of the relevant quantization index Q(c, i, j). The extracted neighboring quantization indexes have the matrix of (2M+1)×(2N+1).

(2) The difference calculator 504 defines that Rt(c, i, j)=R(c, i, j)/D(c) and can obtain the Rt by using the following equations:

$$Rt(c,i,j)=Q(c,i,j)+r, \text{if } Q(c,i,j)>0$$

$$Rt(c,i,j)=Q(c,i,j)-r, \text{if } Q(c,i,j)<0$$

$$Rt(c,i,j)=0, \text{if } Q(c,i,j)=0.$$

In this case, P is obtained by using an equation of P(m, n)=Rt(c, i+m, j+n)−Rt(c, i, j).

(3) The non-correlation signal eliminator 506 and the filter processor 508 perform the same operation as those described above.

Entire Operation

Next, the entire operation of the decoding apparatus 2 (the decoding program 5) will be described.

FIG. 6 is a flow chart of a decoding process (S10) by the decoding program 5 shown in FIG. 4. In this example, a case where the code data (of the JPEG scheme) of image data is input will be described by way of examples.

As shown in FIG. 6, in Step S100, the entropy decoder 40 (FIG. 4) decodes input code data to generate the quantization indexes of each block (8×8 block) and outputs the generated quantization indexes of each block to the dequantizer 50.

In Step S105, the dequantizer 50 (FIG. 4) sets the input quantization indexes as relevant quantization indexes in order and determines whether or not dequantization values for the relevant quantization indexes can be estimated. For example, if the relevant quantization indexes are equal to all neighboring quantization indexes (quantization indexes of neighboring blocks), the dequantizer 50 determines that it is impossible to estimate a dequantization value. Otherwise, the dequantizer 50 determines that it is possible to estimate the dequantization value.

If it is determined that it is possible to estimate the dequantization value, the dequantizer 50 performs Step S110. If it is determined that it is impossible to estimate the dequantization value, the dequantizer 50 performs Step S130.

In Step S110, the dequantization value estimator 500 (FIG. 4) included in the neighboring signal extractor 502 (FIG. 5) extracts the quantization indexes Q(c, i+m, j+n) ($-1 \leq m \leq 1$ and $-1 \leq n \leq 1$ in this example) in the neighborhood of the relevant quantization index Q(c, i, j).

The extracted neighboring quantization indexes are quantization indexes of the transform coefficient kind c in 3×3 blocks around a relevant block and have a 3×3 block.

In Step S115, the difference calculator 504 (FIG. 5) creates the difference matrix P by performing the following calculation using the neighboring quantization indexes extracted by the neighboring signal extractor 502 and the relevant quantization index.

$$P(m,n)=Q(c,i+m,j+n)-Q(c,i,j)$$

The difference matrix P becomes a 3×3 matrix.

In Step S120, the non-correlation signal eliminator 506 (FIG. 5) performs a threshold process for the difference matrix P created by the difference calculator 504, using the threshold TH.

That is, the non-correlation signal eliminator 506 compares the absolute value |P(m, n)| of each difference value included in the difference matrix P to the threshold TH and sets a difference value P(m, n) larger than the threshold TH as 0.

In Step S125, the filter processor 508 (FIG. 5) calculates a correction factor α (c, i, j), using the 3×3 filter kernel K (m, n), by performing a convolution operation for the difference matrix P processed by the non-correlation signal eliminator 506. The calculated correction factor α (c, i, j) is output to the correcting unit 580.

In Step S130, the distribution estimator 520 estimates the distribution of transform coefficients based on the plurality of quantization indexes input from the entropy decoder 40 and outputs distribution data representing the estimated distribution to the random number generator 560.

The random number generator 560 generates random numbers according to the distribution data input from the distribution estimator 520 and outputs the generated random numbers to the dequantization value output unit 590 as the correction factor α.

In Step S135, the dequantizer 50 determines whether or not the correction factor α is generated for all quantization indexes. If it is determined that the correction factor α is generated for all quantization indexes, the process proceeds to Step S140. Otherwise, the process returns to Step 105 where the next quantization index is taken as a relevant quantization index to be processed.

In Step S140, the distribution estimator 520 estimates the distribution of transform coefficients based on the plurality of quantization indexes input from the entropy decoder 40 and outputs the distribution data representing the estimated distribution to the expected value estimator 540.

The expected value estimator 540 calculates an expected value based on the distribution data input from the distribution estimator 520 and outputs the calculated expected value and the distribution data to the correcting unit 580.

The correcting unit 580 corrects the correction factor α input from the filter processor 508, based on the expected value and the distribution data input from the expected value estimator 540. For example, the correcting unit 580 synthesizes and shifts a plurality of correction factors a input from the filter processor 508 to coincide with the distribution estimated by the distribution estimator 520.

The correcting unit 580 (FIG. 4) corrects the correction factor α corrected as described above to fall within the range of −0.5 to 0.5 and outputs the corrected correction factor α to the dequantization value output unit 590.

In Step S145, the dequantization value output unit 590 (FIG. 4) calculates a dequantization value Ry to be applied, based on a relevant quantization index Q and the correction factor α input from the correcting unit 580 and outputs the calculated dequantization value Ry to the inverse transforming unit 60.

Specifically, the dequantization value output unit 590 in this example calculates the dequantization value Ry by performing the following calculation.

$$Ry(c,i,j)=Q(c,i,j)+\alpha(c,i,j)\times D(c)$$

In Step S150, the inverse transforming unit 60 (FIG. 4) performs an inverse transform (an inverse DCT in this example) using the dequantization value (approximate transform coefficient) input from the dequantizer 50 to generate a decode image H.

FIGS. 7A and 7B are diagrams illustrating the filter kernel K applied by the filter processor 508, in which FIG. 7A shows the filter kernel K having the difference value P as its input and FIG. 7B shows the filter kernel K having the quantization index Q or the dequantization value R (corresponding to the quantization index Q) as its input. This example corresponds to a case where a 3×3 matrix is extracted by the neighboring signal extractor 502.

When the difference matrix P created by the difference calculator 504 is input to the filter processor 508, the filter processor 508 applies the filter kernel K having a central value of 0 as shown in FIG. 7A.

In addition, the filter processor 508 may calculate a quantization index Q1 after correction or a dequantization value Ry after correction from the neighboring quantization indexes Q or their dequantization values R using the filter kernel K shown in FIG. 7B.

First, a form of inputting quantization indexes into the filter kernel K shown in FIG. 7B will be described.

In this case, the non-correlation signal eliminator 506 (FIG. 6) prepares the threshold TH and performs a process of setting Q(c, i+m, j+n) as Q(c, i, j) if |P(m, n)|>TH.

Then, the filter processor 508 calculates Q1 according to the following equation (Equation 2).

$$Q1(c, i, j) = \sum_{m=-M}^{M} \sum_{n=-N}^{N} \{K1(m, n) \times Q(c, i+m, j+n)\} \quad \text{(Equation 2)}$$

Here, the filter kernel K can be set to have the same value as that of a filter K shown in FIG. 7A when the following equations are established:

$$K1(m, n) = K(m, n) + Q(c, i, j) \times \left\{1 - \sum_{m}\sum_{n} K(m, n)\right\}, \quad \text{(Equation 3)}$$

if $m = n = 0$,

K1(m, n)=K(m, n), otherwise

In this case, the correcting unit 508 generates a quantization index Q2 by setting α as Q1−Q and correcting the quantization index Q1 such that a value of α falls within the range of −0.5 to 0.5.

The dequantization value output unit 590 calculates the dequantization value Ry by performing a calculation for an equation of Ry(c, i, j)=Q2(c, i, j)×D(c).

The dequantization value Rt is obtained by multiplying D(c) finally in this example. However, such a final multiplication of D(c) can be avoided if the filter kernel itself is multiplied by D(c).

Next, a form of inputting the dequantization index R into the filter kernel K shown in FIG. 7B will be described.

The dequantizer 500 calculates the dequantization value R corresponding to the quantization index Q by performing a calculation for the equation of R(c, i, j)=Q(c, i, j)×D(c).

In this case, the neighboring signal extractor 502 extracts neighboring signals of the dequantization value R, not the quantization index Q. The range of the extraction is similar to that described above.

The difference calculator 504 performs a calculation for the equation of P(m, n)=R(c, i+m, j+n) ×R(c, i, j).

The non-correlation signal eliminator 506 prepares the threshold TH and performs a process of setting R(c, i+m, j+n) as R(c, i, j) if |P (m, n)|>TH. The typical value of TH is D(c).

The filter processor 508 calculates a dequantization value R1(c, i, j) according to the following equation (Equation 4).

$$R1(c, i, j) = \sum_{m=-M}^{M} \sum_{n=-N}^{N} \{K1(m, n) \times R(c, i+m, j+n)\} \quad \text{(Equation 4)}$$

The correcting unit 508 generates a dequantization value R2 by correcting the dequantization value R1 to fall within the quantization interval.

The dequantization value output unit 590 assumes the dequantization value R2 input from the correcting unit 580 as a resultant dequantization value Ry.

Calculation Method of Filter Coefficient

Next, a method of obtaining filter coefficients will be described in detail. In this example, a case where a filter kernel to be obtained is a 3×3 filter K(m, n) (−1≦m, n≦1) and an input is a difference P(m, n) will be described by way of examples.

In addition, for the purpose of simplicity of representation of the difference P(m, n), it is assumed that X0=P(0, 0), X1=P(−1, −1), X2=P(−1, 0), X3=P(−1, 1), X4=P(0, −1), X5=P(0, 1), X6=P(1, −1), and X7=P(1, 1). Xp (p=0, 1, 2, . . . , 8) exists on positions shown in FIG. 8A.

Similarly, for the purpose of simplicity of representation of the filter coefficient K, it is assumed that K0=K(0, 0), K1=K(−1, −1), K2=K(−1, 0), K3=K(−1, 1), K4=K(0, −1), K5=K(0, 1), K6=K(1, −1), and K7=K(1, 1). Kp (p=0, 1, 2, . . . , 8) also exists on positions shown in FIG. 8(B).

First, Y0 is defined as follows:

$$Y0=\{T(c,i,j)-R(c,i,j)\}/D(c)$$

Y0 is a value obtained by dividing a difference between the transform coefficient T and the dequantization value R by the quantization step width D(c). That is, Y0 is a normalization error when the dequantization is performed in the standard JPEG scheme, and takes a value within the range of −0.5 to 0.5. By estimating Y0, it is possible to obtain a more reliable dequantization value. An estimated value of Y0 is assumed as W0.

Here, W0 is linearly estimated using Xp.

$$W0=\Sigma(Xp\times Kb)$$

Next, Kp to make a square error between Y0 and W0 minimal is obtained.

Assuming E[ ] is the function to obtain an expected value, the square error I is expressed as follows:

$$I=E[(Y0-W0)\times(Y0-W0)]$$

To minimize the square error I, the square error I may satisfy the following equation (Equation 5).

$$\frac{\partial I}{\partial Kp} = 0 \quad \text{(Equation 5)}$$

If Equation 5 is modified, it becomes E[Y0×Xp]=E[W0×Xp]. This equation can be again modified into the following equation 6.

If, $RXX(i, j) = E[Xi \times Xj]$, (Equation 6)

$RYX(i) = E[Y \times Xi]$, $$K = \begin{bmatrix} K1 \\ K2 \\ \vdots \\ K8 \end{bmatrix},$$

$$r_{yx} = \begin{bmatrix} RYX(1) \\ RYX(2) \\ \vdots \\ RYX(8) \end{bmatrix}, \text{ and}$$

$$RXX = \begin{bmatrix} RXX(1,1) & RXX(1,2) & \cdots & RXX(1,8) \\ RXX(2,1) & RXX(2,2) & \cdots & RXX(2,8) \\ \vdots & \vdots & \ddots & \vdots \\ RXX(8,1) & RXX(8,2) & \cdots & RXX(8,8) \end{bmatrix},$$

then, $r_{yx} = R_{xx} K$

Equation 6 may be solved with respect to a vector K. Equation 6 is a simultaneous linear equation and Kp satisfying this equation may be obtained.

Although the 3×3 filter is illustrated in this example, filter coefficient optimization can be similarly achieved by using other forms of filters having filter coefficients K(i, j) and input values P(i, j) arrayed in one-dimension.

In addition, an encoding apparatus may perform the filter coefficient calculation process in an encoding operation and put the calculated optimal filter coefficient into the code data.

In this case, the filter processor 508 can perform a filtering process suitable for the code data by performing the filtering process using the filter coefficient put into the code data.

As described above, the decoding apparatus 2 according to this embodiment can obtain the dequantization value having the distribution approximate to that of original transform coefficients by correcting the relevant quantization index and the dequantization value corresponding to the relevant quantization index by referring to different quantization indexes (or, corresponding dequantization values). Accordingly, decoded images having higher quality can be obtained.

In addition, the decoding apparatus 2 according to this embodiment can calculate more appropriate dequantization values by eliminating neighboring quantization indexes considered to have a small correlation with the relevant quantization index.

First Modification

The configuration where a fixed filter or a filter filled in the code data is applied has been described in the above embodiment. A configuration where a substitute filter is applied will be described in the first modification.

Figure 9:
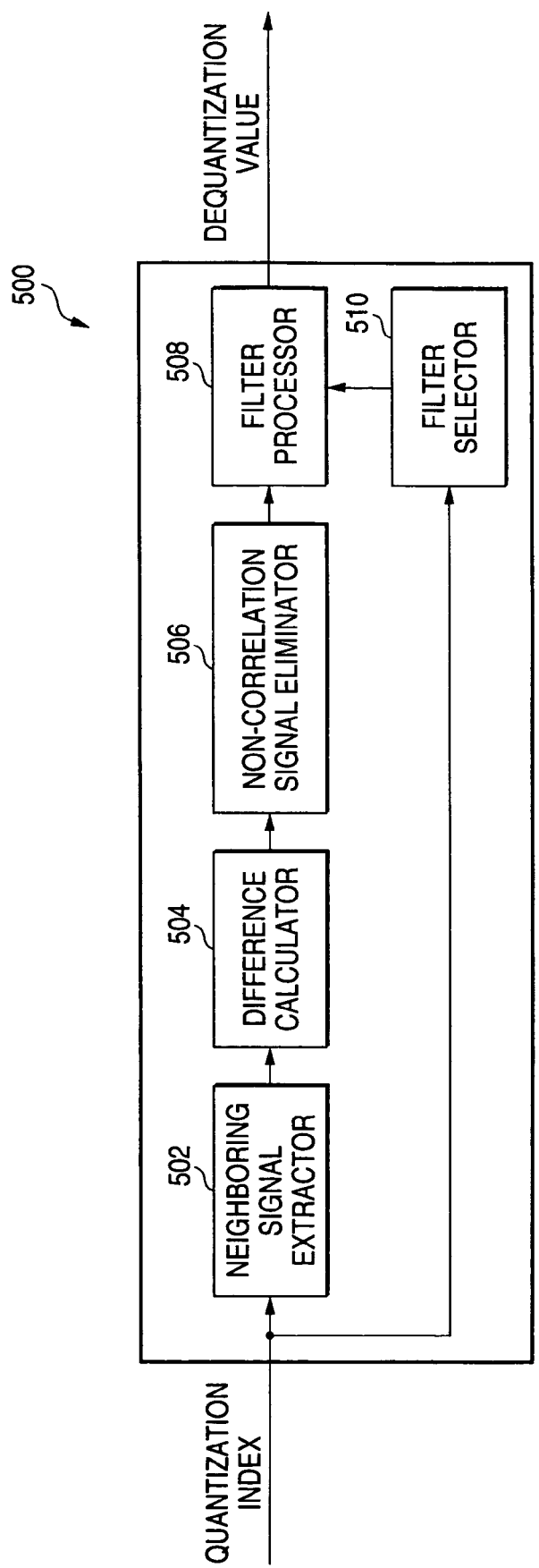
FIG. 9 is a diagram illustrating a configuration of a dequantization value estimator 500 according to a first modification.

FIG. 9 is a diagram illustrating configuration of a dequantization value estimator 500 according to the first modification. As shown in FIG. 9, the dequantization value estimator 500 in the first modification further includes a filter selector 510 in addition to the dequantization value estimator 500 (FIG. 5) in the above embodiment.

The filter selector 510 selects a filter to be applied among a plurality of prepared filters and outputs the selected filter to the filter processor 508.

More specifically, the filter selector 500 may select different filters depending on the following determination factors.

Determination factor (1): a value of the quantization index

Determination factor (2): cases where the quantization index is 0, positive and negative Determination factor (3): cases where the quantization index is 0 and has values other than 0

Determination factor (4): a value produced by calculating (standard deviation of transform coefficients)/(quantization step size)

Determination factor (5): cases of AC component and DC component

In addition, the standard deviation of transform coefficients can be calculated based on the standard deviation of quantization indexes.

The filter selector 510 in this example is input with information on the transform coefficient kind c and selects a filter for each transform coefficient kind c. In particular, since characteristics of transform coefficients in the case where the transform coefficient kind is the DC component are relatively greatly different from characteristics of transform coefficients in the case where the transform coefficient kind is the AC component, different filters are applied depending on at least the AC component and the DC component.

In this case, the filter processor 508 performs a filtering process using the filter selected by the filter selector 510.

Figure 10:
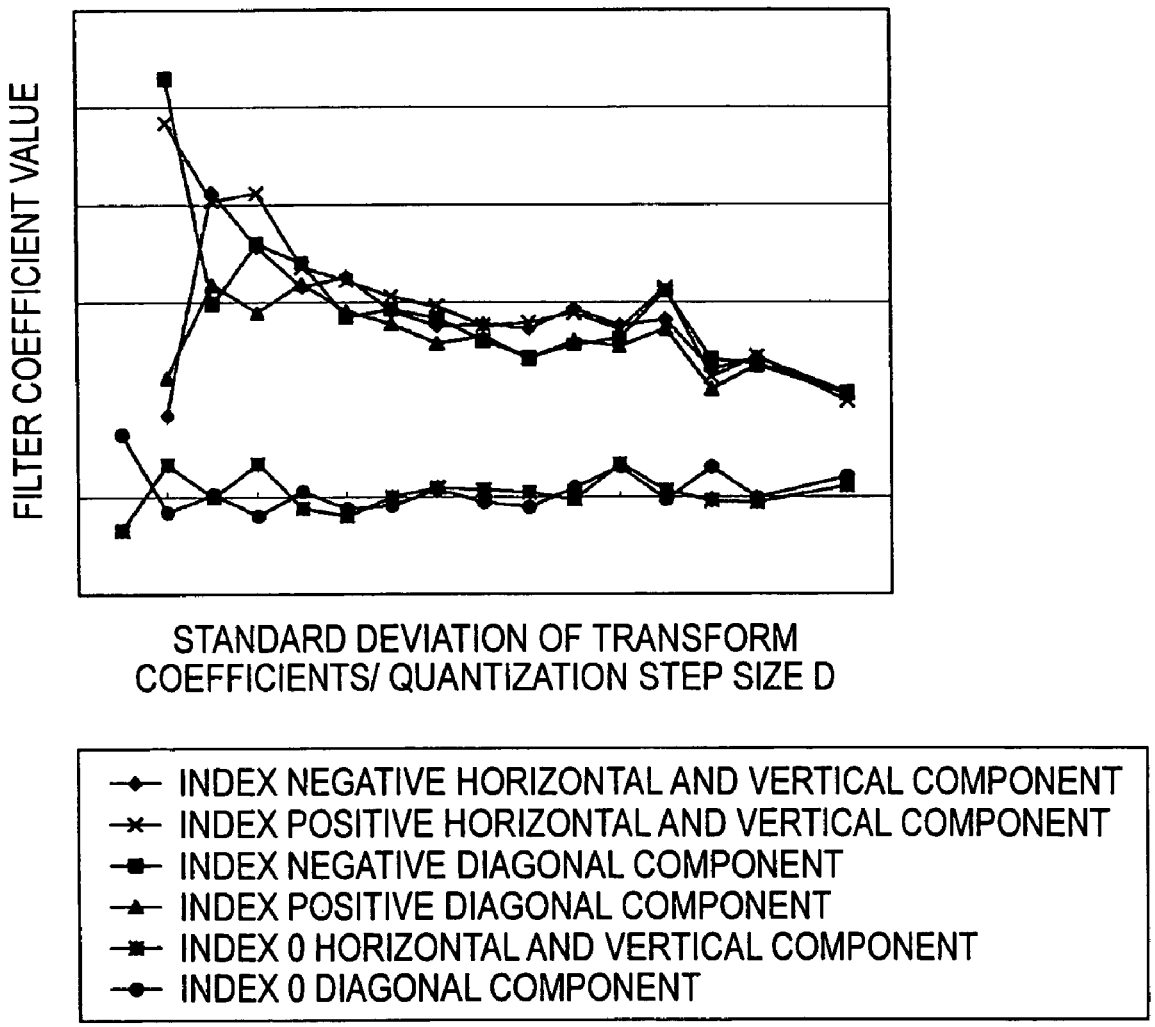
FIG. 10 is a graphical diagram showing optimal filter coefficients calculated using a test image.

FIG. 10 is a graphical diagram showing optimal filter coefficients calculated by using a test image. In this figure, a diagonal component represents an average value of K1, K3, K6 and K8 shown in FIG. 8B, and horizontal/vertical components represent an average value of K2, K4, K5 and K7 shown in FIG. 8B. Further, a horizontal axis represents (variance of transform coefficients)/(quantization step size) and a vertical axis represents a value of the filter coefficient (an average value).

As shown in FIG. 10, in the case where the quantization index Q is 0, positive and negative, the diagonal and horizontal components of an optimal filter coefficient are different. Particularly, in the case of the quantization index Q of 0, the filter coefficient are significantly small as compared to the case of the quantization index Q having positive or negative values.

Furthermore, as shown in FIG. 10, it can be seen that the value of filter coefficient varies according to the value of (the standard deviation of transform coefficients)/(quantization steps) (i.e., along the horizontal axis). That is, it can be seen that the optimal filter coefficient varies depending on the values of transform coefficients and quantization step size (width of the quantization interval).

Then, the filter selector 510 in this modification selects the optimal filter based on the value of the quantization index, the standard deviation of transform coefficients, or the width of quantization interval. That is, the dequantization value estimator 500 substitutes a filter based on the value of the quantization index, the standard deviation of transform coefficients, or the width of quantization interval. Accordingly, the optimal filter is applied to thereby generate more appropriate dequantization values.

In addition, as shown in FIG. 10, since the filter coefficient in the case of the quantization index Q of 0 is approximately 0, the filter selector 510 may prohibit the filter processor 508 from processing the filter when the quantization index Q(c, i, j) is 0.

Second Modification

The filter applied by the filter processor 508 basically has a low pass characteristic. Accordingly, the decoded image may become faint. Particularly, a fine line may be erased.

For this reason, the dequantization value estimator 500 in the second modification looks for the fine line, and, when the fine line is detected, prohibits the filter processor 508 from performing the filtering operation.

Figure 11:
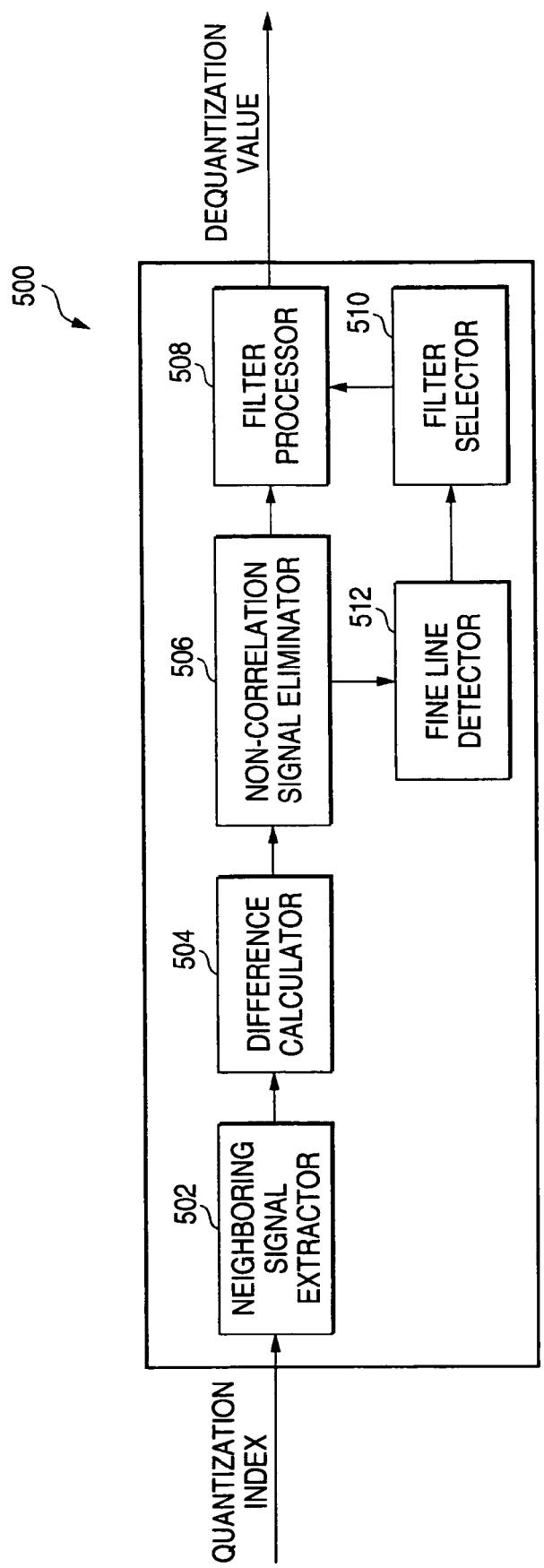
FIG. 11 is a diagram illustrating configuration of a dequantization value estimator 500 according to a second modification.

FIG. 11 is a diagram illustrating configuration of the dequantization value estimator 500 according to the second modification.

As shown in FIG. 11, the dequantization value estimator 500 in the second modification further includes a fine line detector 512 in addition to the dequantization value estimator 500 (FIG. 9) in the above first modification.

The fine line detector 512 detects the presence or absence of the fine line based on input code data and outputs a result of the detection to the filter selector 510.

The fine line detector 512 in this example detects the fine line based on an output from the non-correlation signal eliminator 506. In addition, in this example, a case where the threshold TH applied by the non-correlation signal eliminator 506 is 1 and the output from the non-correlation signal eliminator 506 is one of 0, −1 and 1 will be described by way of examples.

In addition, the fine line detector 512 in this example detects discrete fine lines such as dotted lines as well as continuous fine lines.

Figures 12A, 12B, 12C, 12D:
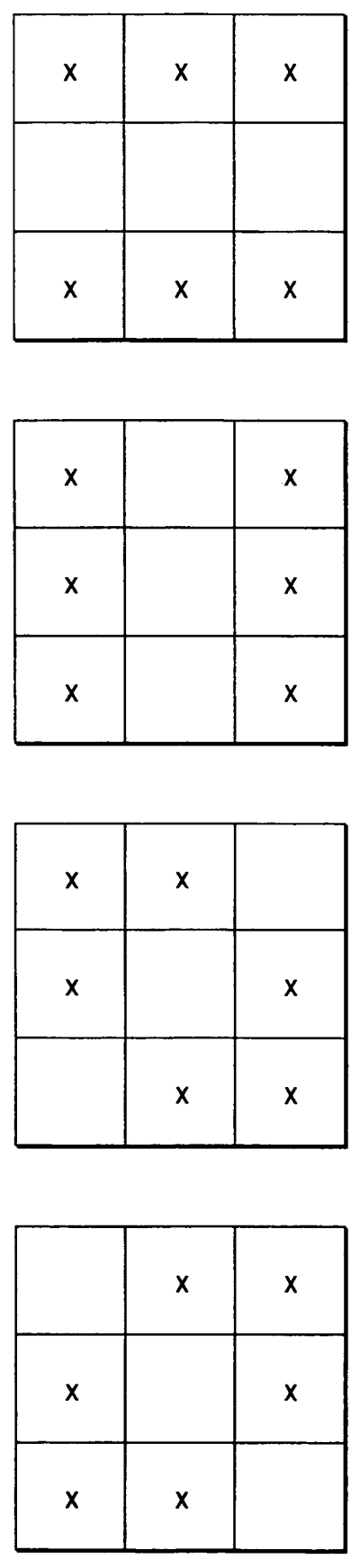

FIGS. 12A to 12D are diagrams illustrating a fine line detection pattern, in which FIG. 12A shows a fine line detection pattern corresponding to a horizontal fine line, FIG. 12B shows a fine line detection pattern corresponding to a vertical fine line, and FIGS. 12C and 12D show a fine line detection pattern corresponding to an oblique fine line, respectively. In this figure, a 3×3 matrix is shown by way of examples.

The fine line detector 512 determines whether values of X positions of a fine detection pattern shown in FIG. 12A are all 1 or −1. If it is determined that the values of X positions are all 1 or −1, the fine line detector 512 determines that a central horizontal line is a line or a dotted line, or a central value is an isolated point.

The fine line detector 512 detects the fine line, dotted line or isolated point in the vertical direction using the fine line detection pattern shown FIG. 12B, and detects the fine line, dotted line or isolated point in the oblique direction using the fine line detection pattern shown FIGS. 12C and 12D.

In this manner, the fine line detector 512 in this example detects the fine line not by detecting the position of the fine line itself, but by determining whether or not the same signal values are present in positions in the neighborhood of the fine line. Accordingly, even when continuous lines, discrete lines such as dotted lines, isolated points or the like are present in the position of the fine line, all of them can be detected.

In addition, when the fine lines are detected by the fine line detector 512, the filter selector 510 can conserve the detected fine lines, dotted lines or isolated points by prohibiting the filter processor 508 from performing the filtering operation.

Other Modifications

Although the JPEG scheme has been described by way of examples in the above embodiment and modifications, the principle of the invention is applicable to the JPEG2000 scheme.

In addition, in the above embodiment, the correcting unit 580 corrects the dequantization value (or the correction coefficient a) estimated by the dequantization value estimator 500 to fall within the preset range. Alternatively, the dequantization value (or the correction factor α) may fall within the preset range by appropriately setting values of the filter coefficients. Accordingly, it is not necessary to correct the dequantization values estimated by the dequantization value estimator 500, the correction factors a, or the quantization indexes. For example, the correction operation of the correcting unit 580 becomes unnecessary by setting the threshold TH as 1 and setting the sum of filter coefficients as less than ½.

As described with reference to the embodiment, there is provided a decoding apparatus including: a reference value extracting unit that extracts reference compression data to be referred for compression data to be processed; and a decoded data generating unit that generates decoded data corresponding to the compression data based on the reference compression data extracted by the reference value extracting unit and the compression data.

It is preferable to configure that the compression data are indexes corresponding to dequantization values, and wherein the decoded data generating unit multiplies the dequantization values corresponding to the reference compression data and the dequantization values corresponding to the compression data by preset weight coefficients and sums up results of the multiplication, a resultant value of the summation being set as a dequantization value of the compression data.

It is preferable to configure that the compression data are indexes corresponding to the dequantization values, wherein the decoding apparatus further includes a difference calculating unit that calculates differences between the dequantization values corresponding to the reference compression data and the dequantization values corresponding to the compression data, and wherein the decoded data generating unit determines the dequantization values of the compression data based on the reference compression data having the differences, which are less than the preset value, calculated by the difference calculating unit.

It is preferable to configure that the decoded data are dequantization values of quantization values quantized with a preset quantization width, wherein the decoded data generating unit generates the dequantization values corresponding to the compression data based on the reference compression data and the compression data, and wherein the decoding apparatus further includes a correcting unit that corrects the dequantization values generated by the decoded data generating unit to fall within the range of the quantization width.

It is preferable to configure that the compression data are quantization indexes generated by a transform encoding process, and wherein the decoded data generating unit generates decoded data corresponding to the quantization indexes without using the reference compression data when the quantization indexes to be processed are 0.

It is preferable to configure that the compression data are quantization indexes corresponding to transform coefficients generated by a transform encoding process, and wherein the decoded data generating unit uses different weight coefficients depending on whether the quantization indexes to be processed correspond to an AC component or a DC component.

It is preferable to configure that the compression data are quantization indexes corresponding to transform coefficients generated by a transform encoding process, wherein the decoding apparatus further includes a coefficient selecting unit that selects the weight coefficients depending on the quantization indexes to be processed or the kind of transform coefficients corresponding to the quantization indexes, and wherein the decoded data generating unit calculates the dequantization values of the compression data using the weight coefficients selected by the coefficient selecting unit.

It is preferable to configure that the compression data are quantization indexes corresponding to transform coefficients generated by a transform encoding process, wherein the decoding apparatus further includes a coefficient selecting unit for selecting the weight coefficients depending on the standard deviation of transform coefficients corresponding to the quantization indexes to be processed and a quantization width corresponding to the quantization indexes, and wherein the decoded data generating unit calculates the dequantization values of the compression data using the weight coefficients selected by the coefficient selecting unit.

It is preferable to configure that the decoding apparatus further includes a fine line determining unit that determines whether the compression data to be processed correspond to fine lines or isolated points, and wherein the decoded data generating unit generates decoded data corresponding to the compression data without using the reference compression data when the fine line determining unit determines that the compression data correspond to the fine lines or the isolated points.

It is preferable to configure that the decoded data generating unit calculates the dequantization values of the compression data using weight coefficients attached to the compression data.

According to the embodiment, there is provided a decoding apparatus including: a reference signal extracting unit that extracts signals in the neighborhood of a central signal to be processed; a difference calculating unit that calculates differences between the neighboring signals extracted by the reference signal extracting unit and the central signal; and a filter processing unit that performs a preset filter process for the differences calculated by the difference calculating unit.

It is preferable to configure that the filter processing unit performs the filter process using filters having filter coefficients of more than 0, the total sum of filter coefficients being less than ½.

According to the embodiment, there is provided a decoding method including: extracting reference compression data to be referred for compression data to be processed; and generating decoded data corresponding to the compression data based on the extracted reference compression data and the compression data.

According to the embodiment, there is provided a decoding method including: calculating weight coefficients based on differences between transform coefficients calculated in a transform encoding process and quantization values of the transform coefficients; attaching the calculated weight coefficients to code data of the transform coefficients; and generating decoded data corresponding to compression data based on the weight coefficients attached to the code data, the compression data included in the code data, and reference compression data included in the code data.

According to the embodiment, there is provided a program product for causing a computer system to execute procedures including: extracting reference compression data to be referred for compression data to be processed; and generating decoded data corresponding to the compression data based on the extracted reference compression data and the compression data.

With the decoding apparatus according to the embodiment, the code data can be more efficiently decoded.

Although the present invention has been shown and described with reference to the embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A decoding apparatus for decoding compression data comprising:
    a reference value extracting unit that extracts, from the compression data, quantization indices $Q(c, i+m, j+n)(-M \leq m \leq M, -N \leq n \leq N)$ for a quantization index $Q(c, i, j)$ to be processed of multiple quantization indexes $Q(c, i, j)$ to be processed, wherein c denotes a transform coefficient, i and j denote a position of each transform coefficient and M, and N denote integers; and
    a decoded data generating unit that generates a dequantization value $Ry(c, i, j)$ of multiple dequantization values $Ry(c, i, j)$, the dequantization value $Ry(c, i, j)$ corresponding to each quantization index $Q(c, i, j)$ to be processed based on each quantization index $Q(c, i, j)$ to be processed and the corresponding extracted quantization indices $Q(c, i+m, j+n)(-M \leq m \leq M, -N \leq n \leq N)$;
    an inverse transforming unit that generates decoded data based on the dequantization values $Ry(c, i, j)$
    wherein different filters are applied when the decoded data generating unit generates the dequantization value $Ry(c, i, j)$, based on whether the transform coefficient corresponds to an AC component or a DC component.

2. The decoding apparatus according to claim 1, wherein the decoded data generating unit multiplies the dequantization values $Ry(c, i, j)$ by preset weight coefficients and sums up results of the multiplication, a resultant value of the summation being set as a dequantization value of the compression data.

3. The decoding apparatus according to claim 1, wherein the dequantization values $Ry(c, i, j)$ are quantized with a preset quantization width, and the decoding apparatus further comprises:
    a correcting unit that corrects the dequantization values $Ry(c, i, j)$ to fall within the range of the quantization width.

4. The decoding apparatus according to claim 1, wherein the quantization indexes $Q(c, i, j)$ to be processed are generated by a transform encoding process, and
    wherein the decoded data generating unit generates the dequantization value $Ry(c, i, j)$ without using the extracted quantization indices $Q(c, i+m, j+n)(-M \leq m \leq M, -N \leq n \leq N)$ when the quantization index $Q(c, i, j)$ to be processed is 0.

5. The decoding apparatus according to claim 2, wherein the quantization indexes $Q(c, i, j)$ to be processed correspond to transform coefficients generated by a transform encoding process, and
    wherein the decoded data generating unit uses different weight coefficients depending on whether the quantization indexes $Q(c, i, j)$ to be processed correspond to an AC component or a DC component.

6. The decoding apparatus according to claim 2, wherein the quantization indexes $Q(c, i, j)$ to be processed correspond to transform coefficients generated by a transform encoding process, the decoding apparatus further comprising:
    a coefficient selecting unit that selects the weight coefficients depending on the quantization indexes $Q(c, i, j)$ to be processed or the kind of transform coefficients corresponding to the quantization indexes $Q(c, i, j)$ to be processed, and wherein the decoded data generating unit calculates the dequantization values Ry(c, i, j) using the weight coefficients selected by the coefficient selecting unit.

7. The decoding apparatus according to claim 2, wherein the quantization indexes Q(c, i, j) to be processed correspond to transform coefficients generated by a transform encoding process, the decoding apparatus further comprising:

a coefficient selecting unit for selecting the weight coefficients depending on the standard deviation of transform coefficients corresponding to the quantization indexes Q(c, i, j) to be processed and a quantization width corresponding to the quantization indexes Q(c, i, j) to be processed, and wherein the decoded data generating unit calculates the dequantization values Ry(c, i, j) using the weight coefficients selected by the coefficient selecting unit.

8. The decoding apparatus according to claim 1, further comprising:

a fine line determining unit that determines whether the quantization indexes Q(c, i, j) to be processed correspond to fine lines or isolated points, wherein the decoded data generating unit generates the dequantization values Ry(c, i, j) without using the extracted quantization indices Q(c, i+m, j+n)(−M≦m≦M, −N≦n≦N) for each quantization index Q(c, i, j) when the fine line determining unit determines that the quantization indexes Q(c, i, j) to be processed correspond to the fine lines or the isolated points.

9. A decoding method for decoding compression data comprising:

extracting from the compression data, quantization indices Q(c, i+m, j+n)(−M≦m≦M, −N≦n≦N) for a quantization index Q(c, i, j) to be processed of multiple quantization indexes Q(c, i, j) to be processed, wherein c denotes a transform coefficient, i and j denote a position of each transform coefficient, and M, and N denote integers;

generating a dequantization value Ry(c, i, j) of multiple dequantization values Ry(c, i, j), the dequantization value Ry(c, i, j) corresponding to each quantization index Q(c, i, i) to be processed based on each quantization index Q(c, i, j) to be processed and the corresponding extracted quantization indices Q(c, i+m, j+n)(−M≦m≦M,−N≦n≦N); and generating decoded data based on the dequantization values Ry(c, i, j);

wherein different filters are applied when the decoded data generating unit generates the dequantization value Ry(c, i, j), based on whether the transform coefficient corresponds to an AC component or a DC component.

10. A computer readable medium encoded with computer executable instructions comprising:

extracting from the compression data, quantization indices Q(c, i+m, j+n)(−M≦m≦M, −N≦n≦N) for a quantization index Q(c, i, j) to be processed of multiple quantization indexes Q(c, i, j) to be processed, wherein c denotes a transform coefficient, i and j denote a position of each transform coefficient, and M, and N denote integers;

generating a dequantization value Ry(c, i, j) of multiple dequantization values Ry(c, i, j), the dequantization value Ry(c, i, j) corresponding to each quantization index Q(c, i, j) to be processed based on each quantization index Q(c, i, j) to be processed and the corresponding extracted quantization indices Q(c, i+m, j+n)(−M≦m≦M,−N≦n≦N); and generating decoded data based on the dequantization values Ry(c, i, j);

wherein different filters are applied when the decoded data generating unit generates the dequantization value Ry(c, i, j), based on whether the transform coefficient corresponds to an AC component or a DC component.

11. The decoding apparatus according to claim 1, wherein the quantization indexes Q(c, i, j) to be processed correspond to the dequantization values Ry(c, i, j) and have information about a kind and a position of transform coefficient, the transform coefficient being used when data is encoded to the compression data.

12. The decoding apparatus according to claim 1, wherein the quantization indices Q(c, i+m, j+n)(−M≦m≦M, −N≦n≦N) for each quantization index Q(c, i, j) to be processed have at least one transform variable of the same kind as the quantization index Q(c, i, j) to be processed.

13. The decoding method for decoding compression data according to claim 9 further comprising:

selecting the weight coefficients depending on the standard deviation of transform coefficients corresponding to the quantization indexes Q(c, i, j) to be processed and a quantization width corresponding to the quantization indexes Q(c, i, j) to be processed, wherein the quantization indexes Q(c, i, j) to be processed correspond to transform coefficients generated by a transform encoding process, and wherein the decoded data generating unit calculates the dequantization values Ry(c, i, j) using the weight coefficients selected by the coefficient selecting unit.

14. The computer readable medium encoded with computer executable instructions according to claim 10 further comprising:

selecting the weight coefficients depending on the standard deviation of transform coefficients corresponding to the quantization indexes Q(c, i, j) to be processed and a quantization width corresponding to the quantization indexes Q(c, i, j) to be processed, wherein the quantization indexes Q(c, i, j) to be processed correspond to transform coefficients generated by a transform encoding process, and wherein the decoded data generating unit calculates the dequantization values Ry(c, i, j) using the weight coefficients selected by the coefficient selecting unit.

* * * * *